United States Patent
Kwon et al.

(10) Patent No.: US 8,054,818 B2
(45) Date of Patent: Nov. 8, 2011

(54) HARQ METHOD IN A MOBILE COMMUNICATION SYSTEM

(75) Inventors: Hwan-Joon Kwon, Suwon-si (KR); Dong-Hee Kim, Yongin-si (KR); Jae-Chon Yu, Suwon-si (KR); Jin-Kyu Han, Seoul (KR); Yu-Chul Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 627 days.

(21) Appl. No.: 11/729,480

(22) Filed: Mar. 29, 2007

(65) Prior Publication Data

US 2007/0263740 A1  Nov. 15, 2007

(30) Foreign Application Priority Data

Mar. 29, 2006  (KR) .................. 10-2006-0028674

(51) Int. Cl.
*H04B 7/208* (2006.01)
(52) U.S. Cl. ........ 370/344; 375/260; 370/329; 370/337; 455/450
(58) Field of Classification Search .................. 370/344, 370/329, 337; 375/260; 455/450
See application file for complete search history.

(56) References Cited

U.S. PATENT DOCUMENTS

2007/0058595 A1* 3/2007 Classon et al. ................ 370/337

OTHER PUBLICATIONS

LG Electronics_Downlink resouce allocation_3GPP TSG RAN WG1_num.42_London-United Kingdom_Aug. 29-Sep. 2, 2005_R1-05083.pdf.*
Monogioudis_Updated Lucent-Nortel-Samsung proposal for Air Interface Evolution Phase 2_TSG-C WG3 C30-20060327-018 Mar. 30, 2006.pdf.*
Eddy Kwon_Downlink Multiplexing for EUTRA_3GPP TSG-RAN WG1 Meeting #42bis San Diego USA Oct. 10-14 2005_R1-051220.pdf.*

* cited by examiner

*Primary Examiner* — Charles Appiah
*Assistant Examiner* — Alexandeer Yi
(74) *Attorney, Agent, or Firm* — The Farrell Law Firm, P.C.

(57) ABSTRACT

A method for allocating resources in an Orthogonal Frequency Division Multiple Access (OFDMA) mobile communication system where data is transmitted by Hybrid Automatic Repeat reQuest (HARQ) is provided, in which a multiplexing mode is selected for multiplexing a Distributed Resource Channel (DRCH) and Localized Resource Channel (LRCH) over orthogonal frequency resources, in which it is determined whether to use persistent resource allocation for each slot, if the selected multiplexing mode is a multiplexing mode that punctures the DRCH onto the LRCH, resources are allocated in an Synchronous HARQ S-HARQ scheme if the persistent resource allocation is used, and resources are allocated in a Resource Adaptive S-HARQ (RAS-HARQ) scheme if the persistent resource allocation is not used and resources are to be reused when early termination of HARQ transmission occurs.

5 Claims, 5 Drawing Sheets

HARQ METHOD IN A MOBILE COMMUNICATION SYSTEM

PRIORITY

This application claims priority under 35 U.S.C. §119(a) to a Korean Patent Application filed in the Korean Intellectual Property Office on Mar. 29, 2006 and assigned Serial No. 2006-28674, the disclosure of which is incorporated herein by reference.

BACKGROUND OF THE INVENTION

1. Field of the Invention

The present invention generally relates to a Hybrid Automatic Repeat reQuest (HARQ) method in a mobile communication system. More particularly, the present invention relates to a method for performing HARQ according to multiplexing and resource allocation in an Orthogonal Frequency Division Multiple Access (OFDMA) system.

2. Description of the Related Art

In general, wireless communication systems are designed to provide communication services to users, irrespective of location. The wireless communication systems have been developed to accommodate multiple users by multiple access schemes. A major multiple access scheme is Code Division Multiple Access (CDMA). CDMA has evolved from voice communication to relatively high-speed data transmission. A driving force behind the CDMA development is a drastic technological development along with user demands for high-speed data transmission. Owing to the technological development, most of $3^{rd}$ Generation (3G) mobile communication systems have been standardized and have also been commercialized.

Due to limited CDMA resources, however, there is a limit on increasing data rate. Nonetheless, user demand for higher data rates continues to increase. In this context, many studies and attempts have been made to improve high-speed data transmission in the wireless communication field.

One of the studies is OFDMA. OFDMA is a technology in which a plurality of channels are configured using orthogonal frequencies and at least one of the channels is allocated to each user, for data transmission.

A brief overview of OFDMA communications will be presented below.

In OFDMA, communication is made by allocating a downlink subchannel and an uplink subchannel. That is, a downlink period and an uplink period are separated within a given time period and the downlink and uplink subchannels are allocated to a user in the downlink and uplink periods, respectively. An OFDMA cellular mobile communication system uses an available frequency in two ways. The frequency utilization is based on a frequency reuse factor.

One of the frequency utilization methods, which is more popular than the other, is that a frequency reuse factor is larger than 1, such as 3 or 7.

Typically, OFDMA physical channels support two types of resource channel structures: Localized Resource Channel (LRCH) and Distributed Resource Channel (DRCH).

In the LRCH structure, a user is assigned a set of contiguous subcarriers at the same positions through a few OFDMA symbols. The set therefore defines time-frequency resources with regularly spaced contiguous subcarriers on contiguous OFDMA symbols. With the LRCH structure, a time-frequency region at a good channel status is allocated to a Mobile Station (MS) in a good channel environment.

With the DRCH structure, a user is allocated a set of subcarriers scattered across a particular time-frequency region. Hence, the DRCH is allocated to an MS that intends to achieve frequency diversity.

FIG. 1 illustrates the LRCH structure and the DRCH structure in the OFDMA system. Referring to FIG. 1, a total available frequency band has a plurality of LRCHs or DRCHs. The total number of the available channels varies depending on certain situations. In the LRCH structure, the entire frequency band is divided into a plurality of subbands along the frequency axis, each being defined as an LRCH for use in subband scheduling.

FIG. 2 illustrates an exemplary DRCH structure in the OFDMA system. The horizontal axis represents time, and the vertical axis represents frequency. Referring to FIG. 2, a minimum time unit is an OFDMA symbol and seven OFDMA symbols form one minimum transmission unit (e.g. slot) along the time axis. A minimum frequency unit is a subcarrier. One DRCH is formed with subcarriers regularly spaced by 8 subcarriers. Different DRCHs are marked differently. In the case illustrated in FIG. 2, each DRCH is repeated once every 8 subcarriers. This is called a repetition period, N. In FIG. 2, N=8. Each DRCH starts at a different subcarrier position in every OFDMA symbol. The starting subcarrier position is represented by an offset. DRCH 1 has an offset of 0 in a first OFDMA symbol, an offset of 3 in a second OFDMA symbol, and an offset of 6 in a third OFDM symbol. In this manner, DRCH 1 can be defined by an offset sequence of {0, 3, 6, 1, 5, 2, 7} on contiguous OFDMA symbols.

As described above, the total frequency band may have LRCHs or DRCHs during one slot. The DRCH and LRCH structures can both be used in one system. There are two resource channel Multiplexing (MUX) modes, MUX mode 1 and MUX mode 2 for the channel assignments, which are described with reference to FIGS. 3 and 4.

FIG. 3 illustrates MUX mode 1. Referring to FIG. 3, DRCHs are defined across a total frequency band, and LRCHs are defined as time-frequency resources in preset subbands. An LRCH is configured with the remaining time-frequency resources except for time-frequency resources (one subcarrier per OFDM symbol) allocated to a DRCH in a subband mapped to the LRCH.

As more DRCHs are sent, the number of time-frequency resources on which the DRCHs are punctured onto LRCHs increases. The remaining DRCH resources can be utilized for the LRCHs. Consequently, resources are efficiently utilized.

FIG. 4 illustrates MUX mode 2. Referring to FIG. 4, the DRCH structure and the LRCH structure are only used on different zones. An LRCH zone is first defined, and the remaining zone is used as a DRCH zone. In MUX mode 2, the same number of LRCHs are configured along the total frequency band and then DRCHs are configured in the remaining zone. Due to the strict distinction between the DRCH zone and the LRCH zone, even though more users are allocated DRCHs, fortunately the amount of resources allocated to LRCH users is not changed. However, since DRCHs should be filled in the remaining time-frequency resources other than those for the LRCHs, resources are wasted when there are a small number of DRCH users or no DRCH users.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an HARQ apparatus and method for efficiently utilizing resources according to a used multiplexing mode and resource allocation method in an OFDMA mobile communication system where persistent resource allocation is co-existent with non-persistent resource allocation, and a reception apparatus and method therefor. The word persistent, as utilized herein, includes the meaning of the word permanent.

Moreover, an aspect of exemplary embodiments of the present invention provides an HARQ apparatus and method for minimizing transmitted control information in a mobile communication system where persistent resource allocation is co-existent with non-persistent resource allocation, and a reception apparatus and method therefor.

In accordance with an aspect of exemplary embodiments of the present invention, there is provided a method for allocating resources in an OFDMA mobile communication system where data is transmitted by HARQ is provided, in which a multiplexing mode is selected for multiplexing a DRCH and an LRCH over orthogonal frequency resources, it is determined whether to use persistent resource allocation for each slot, if the selected multiplexing mode is a multiplexing mode that punctures the DRCH onto the LRCH, resources are allocated in an S-HARQ scheme if the persistent resource allocation is used, and resources are allocated in a RAS-HARQ scheme if the persistent resource allocation is not used and resources are to be reused when early termination of HARQ transmission occurs.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF PREFERRED EMBODIMENTS

Figure 1:
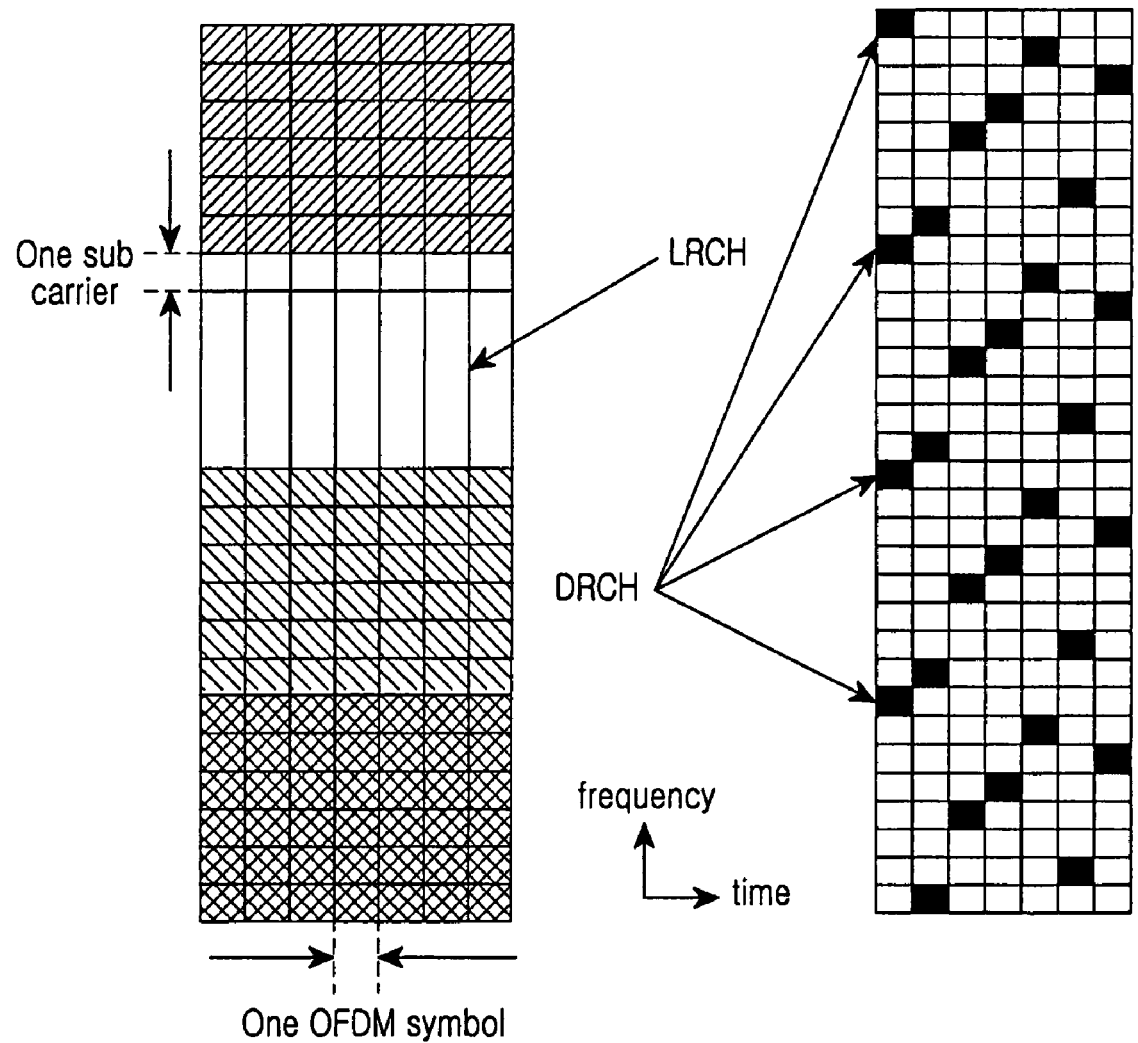
FIG. 1 illustrates typical LRCH and DRCH structures.
Figure 2:
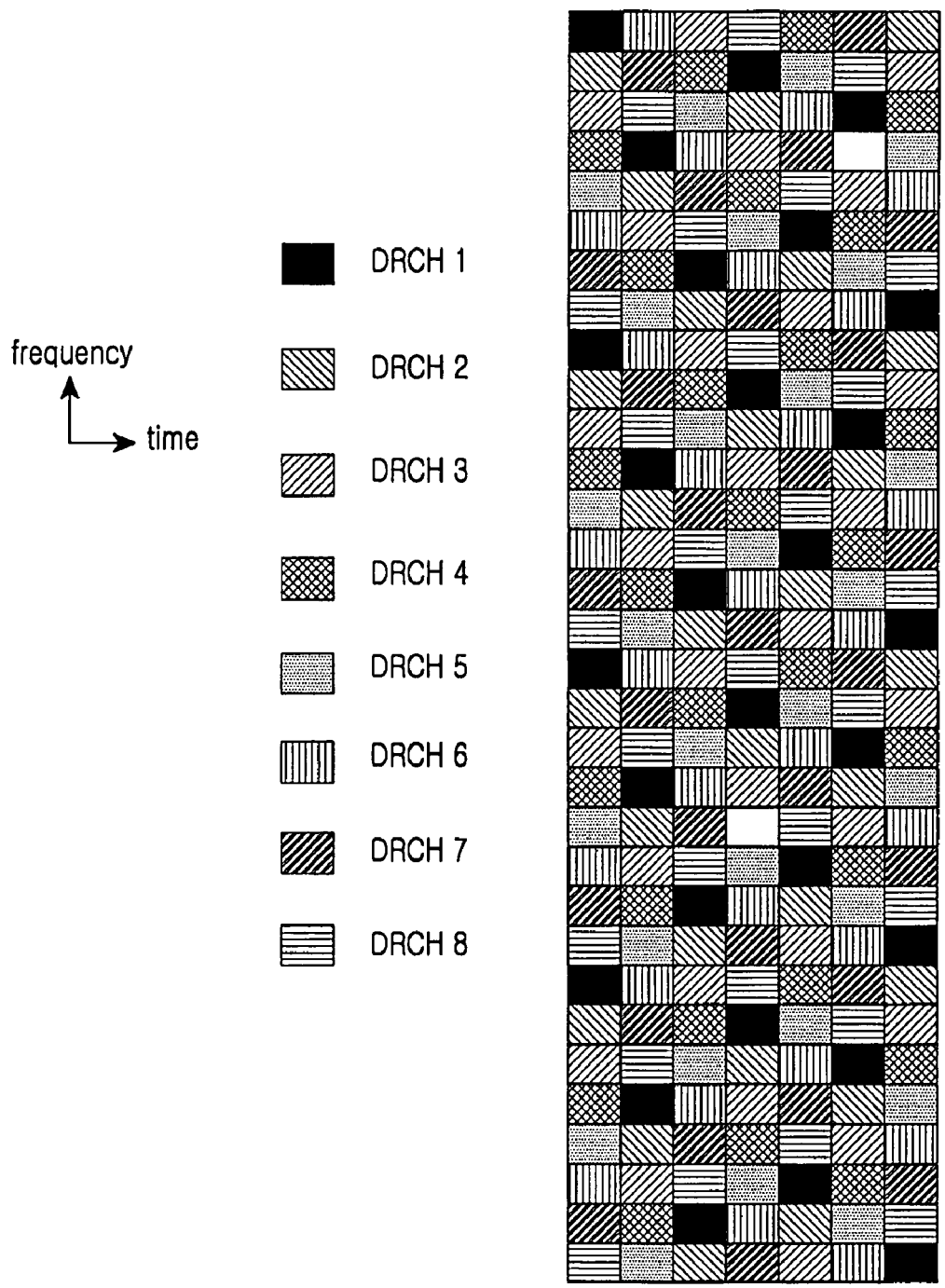
FIG. 2 illustrates an exemplary DRCH structure.
Figure 3:
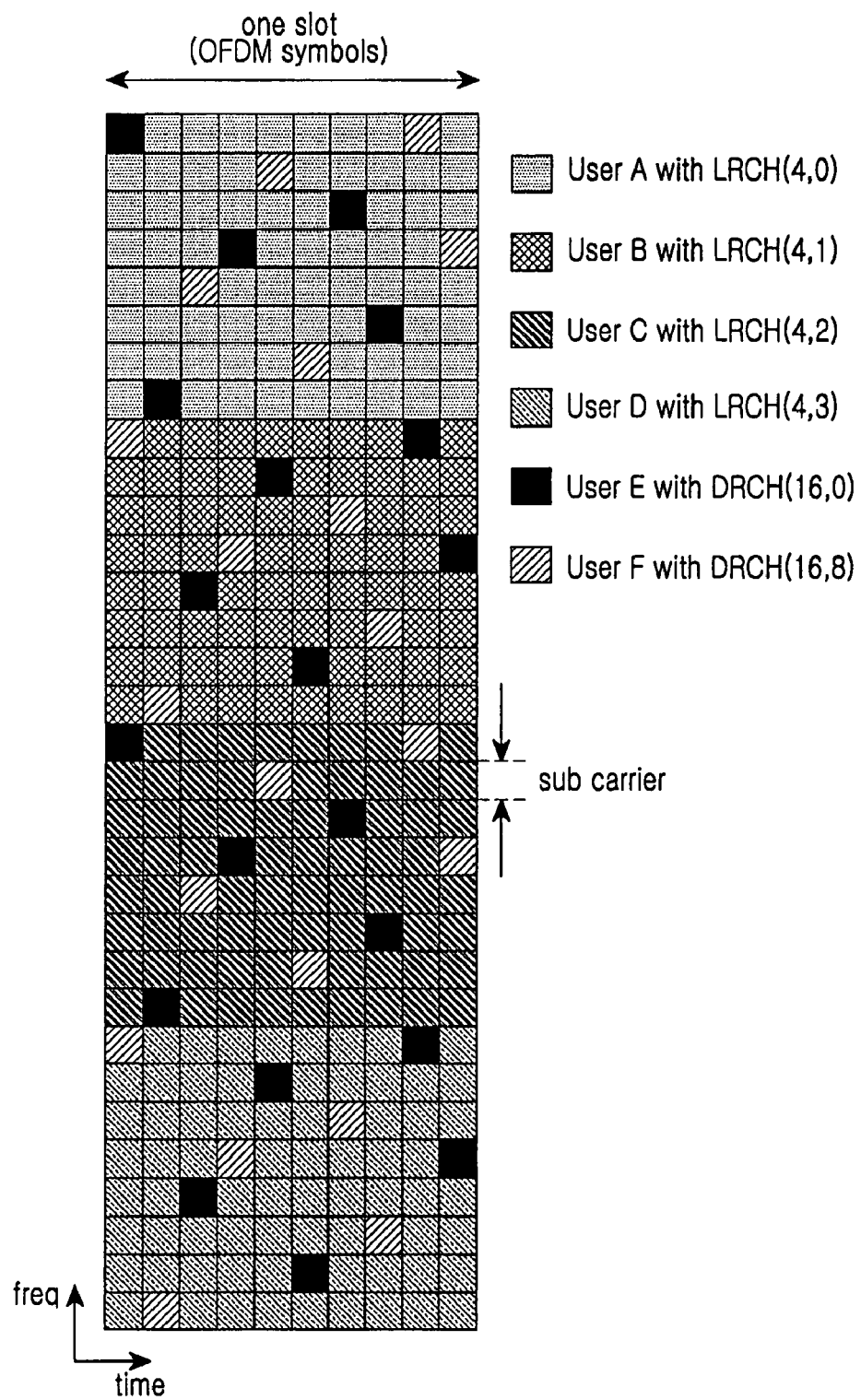
FIG. 3 illustrates MUX mode 1.
Figure 4:
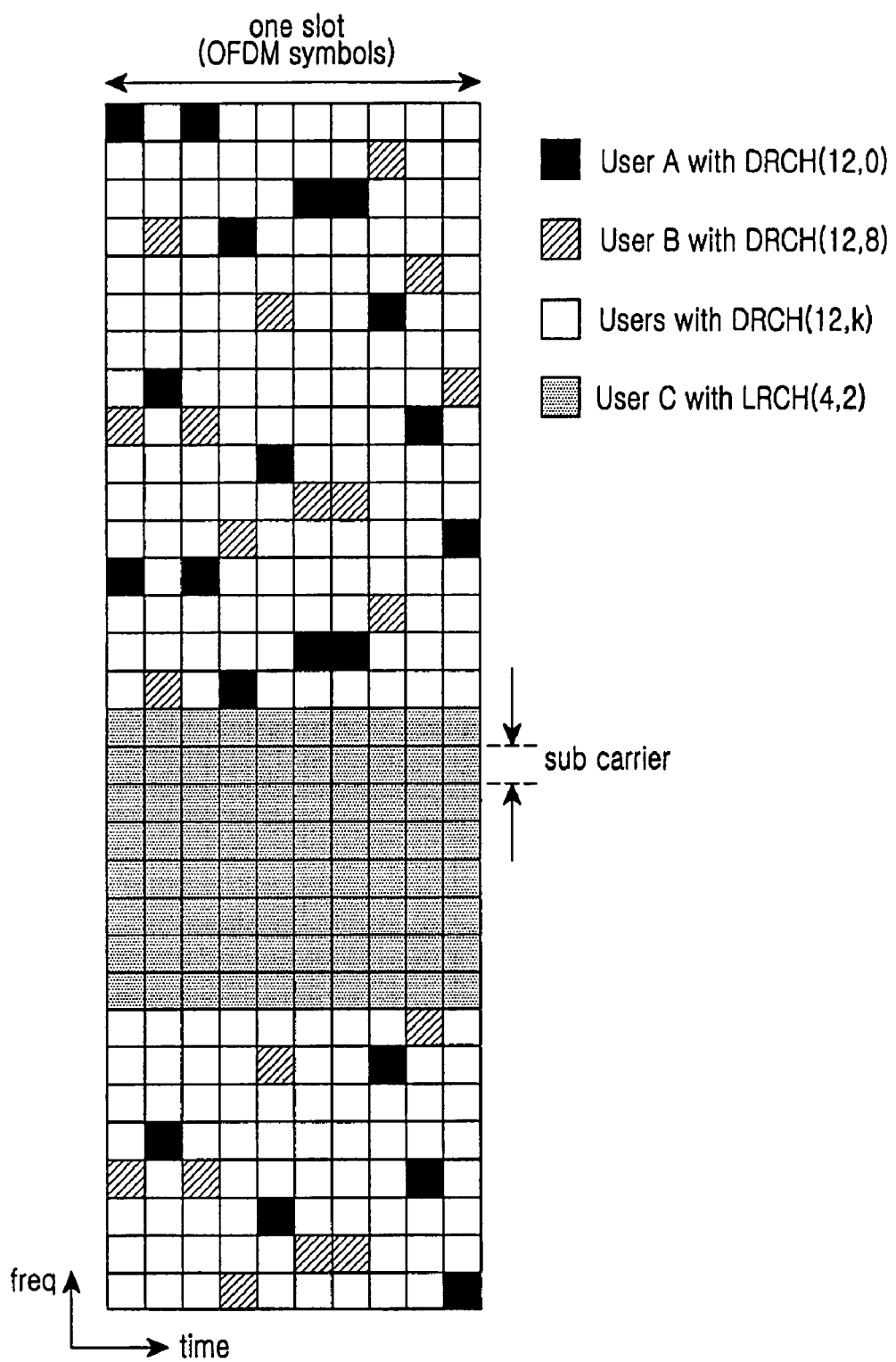
FIG. 4 illustrates MUX mode 2.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

Aside from the definition and multiplexing of physical channels, resource allocation can be considered in two ways: persistent resource allocation and non-persistent resource allocation. A legacy mobile communication system supporting voice service only allocates a predetermined ratio of resources to a user by fixed resource allocation, an example of which is code allocation in Interim Standard 95 (IS-95). This resource allocation scheme saves resources used for transmission of control information.

A High Rate Packet Data (HRPD) system, which has recently been proposed for packet scheduling, supports only non-persistent resource allocation because it monitors the channel status of each user and allocates all resources to a user in a good channel status. A control channel is sent every scheduling period to notify which MS to receive data.

The difference between the above two resource allocation schemes is caused by different service applications provided by the resource allocation schemes. A voice call requiring continuous data transmission and best-effort data transmission requiring transmission of a large amount of data naturally requires different source allocation schemes.

A mobile communication system of the present invention is designed to support voice, video as well as best-effort traffic, hence the reason for discussing two resource allocation schemes for use in the mobile communication system.

For persistent resource allocation, once resources are allocated, an initial transmission packet can be sent without a control signal when packet transmission is performed with a predetermined transmission period. In the present invention, the persistent resource allocation scheme is used for HARQ. The predetermined period can be fixed to, for example, 20 msec or any other value. If an MS succeeds in decoding an encoder packet within 20 msec, it sends an ACKnowledgement (ACK) packet. The remaining slots to the boundary of the next 20 msec can be utilized by other users by non-persistent resource allocation.

In case of non-persistent allocation, an initial transmission packet can be sent in an arbitrary slot, which means that control information is required for every initial allocation. HARQ can also be used in the non-persistent resource allocation scheme.

A description is now provided of HARQ schemes to support the above transmission schemes.

The HARQ technology is widely used for stable packet transmission in mobile communication systems that provide packet services, in which an MS notifies a Base Station (BS) whether a packet transmitted by the BS has been successfully received and the BS retransmits the packet if the packet reception fails. HARQ is one of the link control protocols, in which an MS requests retransmission of an erroneous packet transmitted by the BS to the BS. In real implementation, it is impossible to receive a packet transmitted over a wireless network without any distortion or noise in the mobile communication systems. To avert this problem, various packet retransmission techniques have been proposed.

Some terms used herein in connection with the HARQ technology are defined as follows:
Packet: original information before encoding.
Subpacket: a set of bits sent at one time, when an encoded bit stream is divided into a plurality of sets of bits, for transmission.
Control information: additional information needed for reception of a subpacket or a packet.
Initial transmission subpacket: the first of subpackets to be transmitted.
Retransmission subpacket: a subpacket following the first subpacket.

HARQ schemes can be categorized into Synchronous HARQ (S-HARQ) and ASynchronous HARQ (AS-HARQ). With S-HARQ, retransmission is carried out at a predetermined time with respect to initial transmission. Synchronous means synchronization in time. In contrast, the time interval between initial transmission and retransmission is not set in AS-HARQ. The present invention is described in the context of S-HARQ that allows for easy implementation and simple operation. S-HARQ is further branched into pure S-HARQ that allows retransmission without a change in resources and Resource Adaptive S-HARQ (RAS-HARQ) that may change resources for retransmission. Hereinafter, a pure S-HARQ system is simply referred to as an S-HARQ.

In the S-HARQ scheme, a retransmission time and resources are preset. If persistent resource allocation is adopted for the S-HARQ scheme, even an initial transmission time can be fixed. The RAS-HARQ scheme differs from the S-HARQ scheme in that, when control information is delivered for retransmission, resources can be changed for a retransmission packet. For persistent resource allocation, an initial transmission time can be fixed also in the RAS-HARQ.

In an application of the two HARQ schemes to the OFDMA system where data can be sent simultaneously on a plurality of channels in one time slot, a retransmission channel is fixed in the S-HARQ and a channel number is changed for retransmission, when needed, in the RAS-HARQ.

The system to which the present invention is applied operates in the following manner:

(1) The BS periodically notifies the MS of a MUX mode to be used.

(2) The BS sends a packet to the MS according to a resource allocation method and an HARQ method, both suitable for the MUX mode.

In MUX mode 1, the remaining resources except for DRCH resources scattered across an entire frequency band are used for LRCHs. Since the amount of LRCH resources decreases with the number of DRCHs, MUX mode 1 can be appropriately used in case of a small number of DRCHs. In terms of resource reuse, MUX mode 1 is efficient because LRCHs can occupy all of the remaining resources except for the DRCH resources. Also, the remaining resources can be used for DRCHs again, which is required when high-speed users are supported.

Considering the aspect of resource allocation in MUX mode 1, the persistent resource allocation scheme is adopted for a delay-sensitive service application requiring a fixed rate at or above a certain level such as VoIP. Due to the use of HARQ, early termination may occur. In this case, the remaining resources may be utilized as LRCHs or DRCHs for other users by non-persistent allocation. If the remaining resources are allocated as LRCHs, unused DRCHs are naturally allocated as the LRCHs. Thus, the remaining resources can be used in scheduling, without any particular signaling.

Because frequency selective scheduling is performed for LRCHs, a current subband needs to be kept for retransmission. Therefore, the S-HARQ is feasible in this case.

If the remaining resources resulting from early termination are reallocated as DRCHs, a retransmission packet with non-persistently allocated resources may collide with an initial transmission packet with persistently allocated resources, when the resources are identical. Then it is necessary to shift the non-persistently allocated sources. For this purpose, the RAS-HARQ is required.

In summary, because MUX mode 1 is used for a small number of DRCH users, even though resources may remain as a result of early termination of data transmission in persistently allocated resources, they can all be allocated to LRCHs. Therefore, resource use efficiency can be increased with the positions of the persistently allocated resources kept unchanged. If the remaining resources are utilized as DRCHs, an HARQ scheme that shifts resources is needed because of a possibility of resource collision between initial transmission using the persistent resource allocation and retransmission using the non-persistent resource allocation.

In MUX mode 2, part of the entire frequency band is preset as the use of LRCHs and DRCHs are reconfigured in the remaining resources. Since the DRCHs are not punctured onto the LRCHs, MUX mode 2 is preferable for a large number of DRCH users. A shortcoming with MUX mode 2 is that the remaining resources resulting from early termination of the DRCHs are inevitably reused as DRCHs. Moreover, more DRCH users may increase the number of early terminations and DRCH resources may take a splintered form at a given time instant. Allocation of the splintered resources to individual MSs requires a large signaling overhead. Therefore, a plurality of available resources need to be shifted to one place, prior to signaling in order to increase resource allocation efficiency. The resource shifting with available resources and resources in use separated from each other can be implemented by the RAS-HARQ scheme. For example, if DRCH 1 to DRCH 10 are allocated and DRCH 1, 3, 6, 7 and 9 are terminated early, the remaining resources need to be concentrated for simultaneous allocation to particular MSs, for efficient reuse of the remaining resources in the next slot. That is, DRCHs 2, 4, 5, 8 and 10 are shifted to the positions of DRCH 1 to DRCH 5, the resources of DRCH 5 to DRCH 10 are divided at desired ratios, for allocation to other MSs. In this way, MUX mode 2 offers the benefit of efficient reallocation of remaining resources in each slot by preventing resource splintering caused by early termination.

The above-described two MUX modes, two resource allocation schemes, and two HARQ schemes are summarized in Table 1 below.

TABLE 1

| MUX mode | Resource allocation type of current slot | Original resource allocation type | HARQ |
|---|---|---|---|
| 1. DRCH is punctured onto LRCH | Persistent Non-persistent | Persistent Persistent (when remaining resources are allocated after early termination) Non-persistent | S-HARQ S-HARQ (LRCH) RAS-HARQ (DRCH) S-HARQ |
| 2. LRCH resources are protected | Persistent Non-persistent | Persistent | RAS-HARQ RAS-HARQ (DRCH) S-HARQ (LRCH) |

Figure 5:
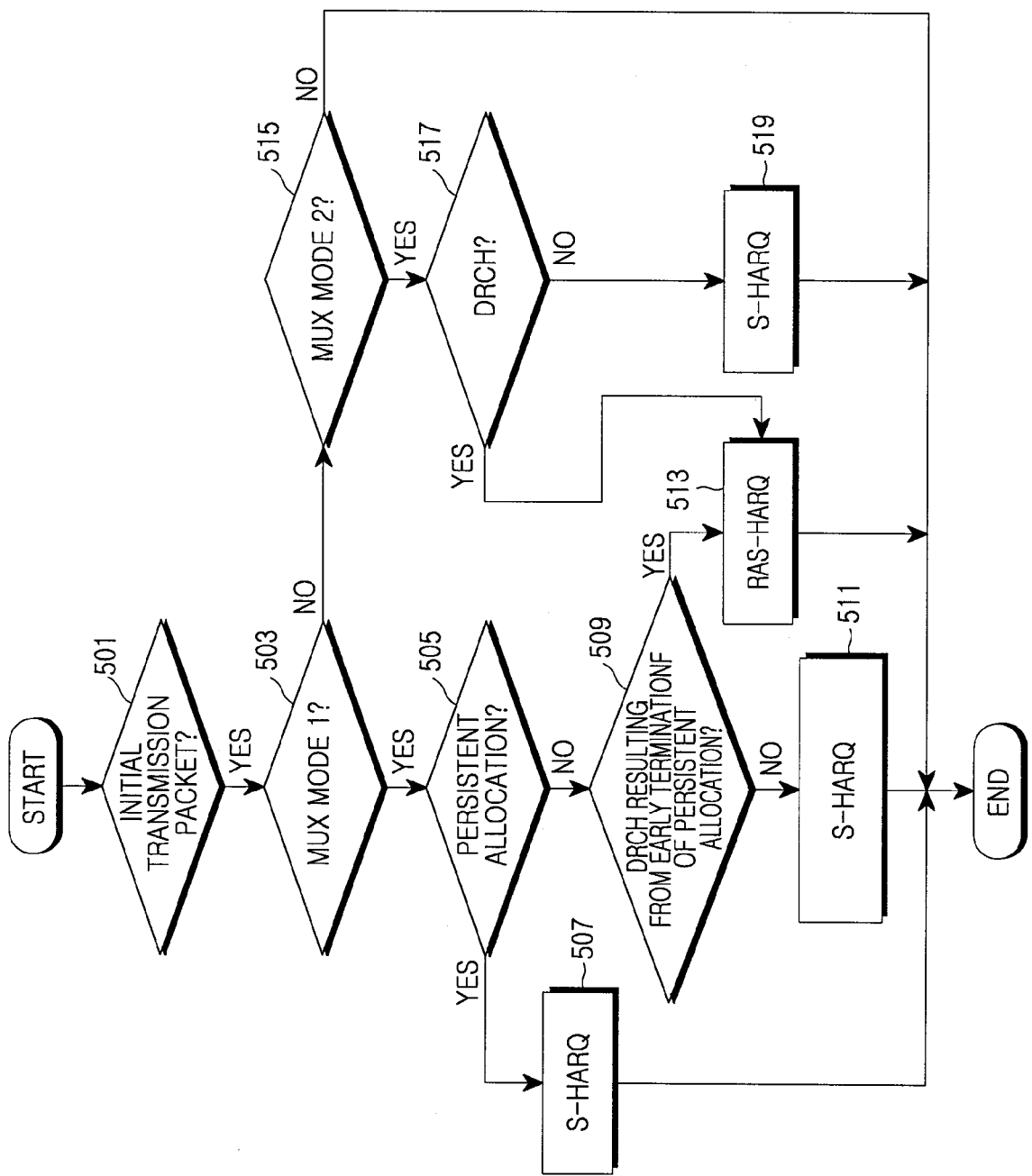
FIG. 5 is a flowchart illustrating an HARQ method in a mobile communication system according to an exemplary embodiment of the present invention.

FIG. 5 is a flowchart illustrating an HARQ method in a mobile communication system according to an exemplary embodiment of the present invention. Referring to FIG. 5, the BS determines whether a packet to be sent is an initial transmission packet in step 501. If the packet is not an initial transmission packet, the BS is in an idle state. On the other hand, In case of an initial transmission packet, the BS determines whether a MUX mode for the initial transmission packet is MUX mode 1 where the DRCH is punctured onto the LRCH in step 503.

If the MUX mode is MUX mode 1, the BS determines whether the persistent resource allocation scheme is used in step 505. For the persistent resource allocation scheme, the BS operates according to the S-HARQ using a DRCH in step 507.

For the non-persistent allocation scheme, the BS determines whether a DRCH which becomes available due to early termination of persistent allocation is used in step 509. If the DRCH is used, the BS operates according to the RAS-HARQ in step 513. If resources of the initial transmission packet are not those resulting from the early termination but non-persistently allocated ones, the BS uses the S-HARQ in step 511. If an LRCH is allocated for the initial transmission packet, the BS uses the S-HARQ irrespective of early termination.

Meanwhile, if the MUX mode is not determined to be MUX mode 1 in step 503, the BS determines whether the MUX mode is MUX mode 2 in step 515.

If the MUX mode is not MUX mode 2 either, the BS ends the algorithm. For MUX mode 2, the BS determines whether a DRCH is used in step 517. If the DRCH is used, the BS adopts the RAS-HARQ in step 513. If the DRCH is not used, the BS uses the S-HARQ in step 519.

As is apparent from the above description, the present invention advantageously increases resource use efficiency because an appropriate HARQ scheme is adopted depending on persistent resource allocation or non-persistent allocation in a system supporting two MUX modes.

Also, the present invention enables efficient resource utilization according to a used MUX mode and resource allocation scheme in an OFDMA mobile communication system where persistent resource allocation is coexistent with non-persistent resource allocation.

Furthermore, the present invention minimizes transmitted control information in a mobile communication system where persistent resource allocation is coexistent with non-persistent resource allocation.

While the invention has been shown and described with reference to a certain exemplary embodiment of the present invention thereof, it will be understood by those skilled in the art that various changes in form and details may be made therein without departing from the spirit and scope of the present invention, as defined by the appended claims and equivalents thereof.

What is claimed is:

1. A method for allocating resources in an Orthogonal Frequency Division Multiple Access (OFDMA) mobile communication system where data is transmitted by Hybrid Automatic Repeat reQuest (HARQ), the method comprising: selecting, from a plurality of multiplexing modes, a multiplexing mode for multiplexing a Distributed Resource Channel (DRCH) and a Localized Resource Channel (LRCH) over orthogonal frequency resources; determining whether to use persistent resource allocation for each slot, if the selected multiplexing mode is a multiplexing mode that punctures the DRCH onto the LRCH; allocating resources in a Synchronous HARQ (S-HARQ) scheme if the persistent resource allocation is used; and allocating resources in a Resource Adaptive Synchronous HARQ (RAS-HARQ) scheme if the persistent resource allocation is not used and resources are to be reused when early termination of HARQ transmission occurs, wherein during the persistent resource allocation, once resources are allocated, an initial transmission packet is sent without a control signal when packet transmission is performed within a predetermined transmission period.

2. The method of claim 1, further comprising allocating resources in the S-HARQ scheme, if the persistent resource allocation is not used and resources need not be reused when early termination of HARQ transmission occurs.

3. The method of claim 1, further comprising: determining whether to use the persistent resource allocation for each slot if the selected multiplexing mode is a multiplexing mode that protects LRCH resources; and allocating resources in the RAS-HARQ scheme, if the persistent resource allocation is used.

4. The method of claim 1, further comprising: determining, in one of the plurality of multiplexing modes, whether to use the persistent resource allocation for each slot if the selected multiplexing mode is a multiplexing mode that protects LRCH resources; determining, in another of the plurality of multiplexing modes, whether to use resources remaining after allocating resources to the DRCH, if the persistent resource allocation is not used; and allocating resources in the RAS-HARQ scheme, if the remaining resources are used for the DRCH.

5. The method of claim 1, further comprising: determining, in one of the plurality of multiplexing modes, whether to use the persistent resource allocation for each slot if the selected multiplexing mode is a multiplexing mode that protects LRCH resources; determining, in another of the plurality of multiplexing modes, whether to use resources remaining after allocating resources to the LRCH from unused DRCHs, if the persistent resource allocation is not used; and allocating resources in the S-HARQ scheme, if the remaining resources are used for the LRCH.

* * * * *